United States Patent
Kervec et al.

(10) Patent No.: US 8,270,491 B2
(45) Date of Patent: Sep. 18, 2012

(54) DEVICE FOR GENERATING AN INTERPOLATED FRAME

(75) Inventors: Jonathan Kervec, Paimpont (FR);
Didier Doyen, La Bouexiere (FR);
Hassane Guermoud, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 586 days.

(21) Appl. No.: 11/989,174

(22) PCT Filed: Jul. 27, 2006

(86) PCT No.: PCT/EP2006/064737
§ 371 (c)(1), (2), (4) Date: Jul. 22, 2009

(87) PCT Pub. No.: WO2007/012659
PCT Pub. Date: Feb. 1, 2007

(65) Prior Publication Data
US 2009/0316784 A1   Dec. 24, 2009

(30) Foreign Application Priority Data
Jul. 28, 2005   (FR) .................................... 05 52362

(51) Int. Cl.
*H04B 1/66* (2006.01)
(52) U.S. Cl. ......... 375/240.16; 375/240.15; 375/240.14; 375/240.12; 382/236; 382/238; 348/699; 348/700
(58) Field of Classification Search ............. 375/240.16, 375/240.15, 240.14, 240.12; 382/236, 238; 348/699, 700
See application file for complete search history.

(56) References Cited

U.S. PATENT DOCUMENTS 5,057,921 A * 10/1991 Robert et al. ................. 348/459
5,610,661 A    3/1997 Bhatt
5,969,777 A * 10/1999 Mawatari ................. 375/240.26

FOREIGN PATENT DOCUMENTS

CN   1134090 A   10/1996
EP   0360413     3/1990
(Continued)

OTHER PUBLICATIONS

S. Tubaro et al: "Motion Field Estimators and their Application to Image Interpolation" Motion Analysis and Image Sequence Processing, 1993, pp. 153-187.

(Continued)

*Primary Examiner* — Shawn An
(74) *Attorney, Agent, or Firm* — Tutunjian & Bitetto, P.C.

(57) ABSTRACT

The present invention is situated within the frame or video processing domain and more particularly in the domain of video interpolation. It relates to a device for generating an interpolated frame from source frames temporarily surrounding it. This device comprises motion estimation means, motion compensated interpolation means, linear interpolation means, means for mixing the frame produced by the motion compensated interpolation means with the frame produced by the linear interpolation means. According to the invention, the mixing coefficients assigned to these two frames depend on the displaced frame difference and/or the frame difference between the source frames surrounding this interpolated frame and/or estimated motion vectors.

6 Claims, 7 Drawing Sheets

FOREIGN PATENT DOCUMENTS

| | | |
|---|---|---|
| EP | 0390660 | 10/1990 |
| EP | 390660 | 10/1990 |
| EP | 0734177 A2 | 9/1996 |
| EP | 0957367 | 11/1999 |
| JP | 62111586 | 5/1987 |
| JP | 4079509 | 12/1992 |
| JP | 8322023 | 12/1996 |
| JP | 9172618 | 6/1997 |
| JP | 2831792 | 9/1998 |
| JP | 3181431 | 4/2001 |
| JP | 2003530786 | 10/2003 |
| WO | WO0178389 | 10/2001 |

OTHER PUBLICATIONS

G. De Haan at al: "Deinterlacing—An Overview", Proceedings of the IEEE, vol. 86, No. 9, Sep. 1, 1998, pp. 1839-1857.

Jelena Kovacevic et al: "Deinterlacing by Successive Approximation", IEEE Transactions on Image Processing, vol. 6, No. 2, Feb. 1997, pp. 339-344.

A.M. Bock: "Motion-Adaptive Standards Conversion Between Formats of Similar Field Rates", Signal Processing, Image Communication, Elsevier Science Publishers, Amsterdam, NL, vol. 6, No. 3, Jun. 1, 1994, pp. 275-280.

Search Report Dated Dec. 4, 2006.

\* cited by examiner

DEVICE FOR GENERATING AN INTERPOLATED FRAME

This application claims the benefit, under 35 U.S.C. §365 of International Application PCT/EP2006/064737, filed Jul. 27, 2006, which was published in accordance with PCT Article 21(2) on Feb. 1, 2007 in French and which claims the benefit of French patent application No. 0552362, filed Jul. 28, 2005.

The present invention is situated within the frame or video processing domain and more particularly in the domain of video interpolation. It relates to a frame interpolation device, which is implemented or inserted in any type of frame display device such as plasma display screens, liquid crystal devices or cathode ray tubes.

The standard motion compensated frame interpolation techniques require the use of a motion estimator. This estimator calculates a motion vector for each pixel of the frame to interpolate from source frames temporarily "surrounding" the frame to interpolate and possibly previously estimated motion vectors. This motion vector can be calculated in several possible ways:

either one first estimates a motion vector for each pixel of one of the two source frames surrounding the frame to interpolate then the motion vector of a pixel of the frame to interpolate is deduced from this by assigning it with the estimated motion vector of the source frame crossing or passing in proximity to the considered pixel of the frame to interpolate, or a motion vector for the pixels of the frame to interpolate is estimated directly from one or two source frames surrounding it and from previously estimated motion vectors.

Figure 1:
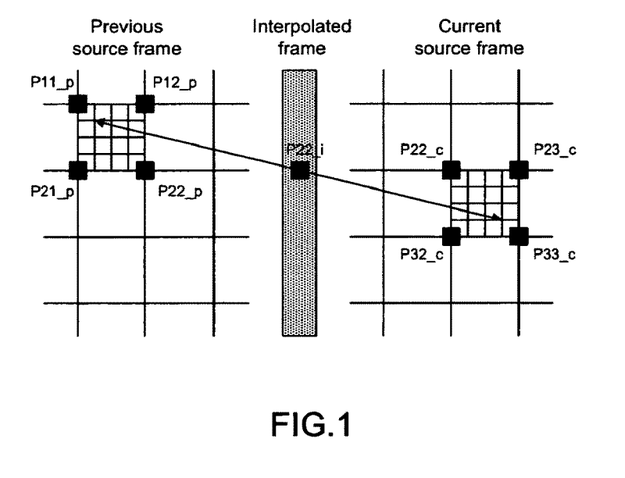

The motion compensated video interpolation is then made in the direction of the motion by being based on the video information of at least one of the two source frames surrounding the frame to interpolate and on the motion vectors calculated for the frame to interpolate. FIG. 1 illustrates the manner in which a frame inserted between a previous source frame and a current source frame. In this example, the interpolated frame is situated temporarily at mid-distance between the previous source frame the current source frame. This interpolation is traditionally used to modify the display frequency of the video sequence and to raise it for example from 50 HZ to 100 Hz. In this example, the motion vector estimated for the pixel P22_$i$ of the interpolated frame points to one extremity of a point located between the pixels P11_$p$, P12_$p$, P21_$p$, P22_$p$ of the previous source frame and at the other extremity on a point situated between the pixels P22_$c$, P23_$c$, P32_$c$, P33_$c$ of the current source frame. The video information that is assigned to the pixel P22_$i$ is therefore a combination of the video information of the pixels P11_$p$, P12_$p$, P21_$p$, P22_$p$, P22_$c$, P23_$c$, P32_$c$ and P33_$c$.

Figure 2:
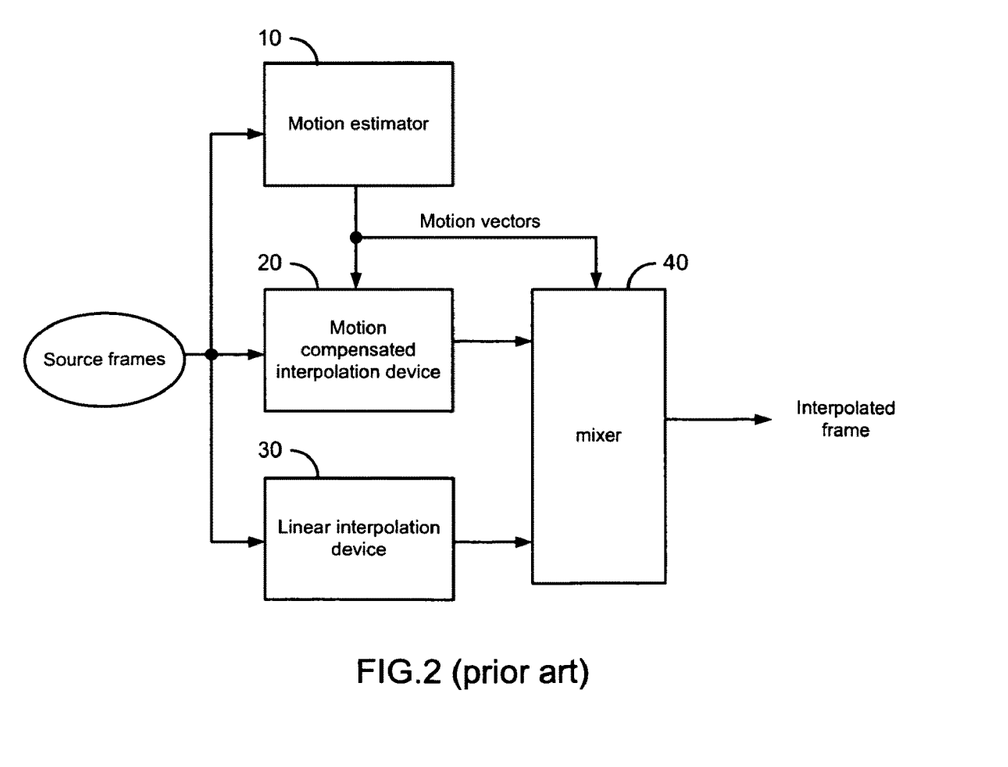

In theory, this motion compensated interpolation gives good results. In practice, the failures of the motion estimator in some zones of the image, particularly the zones that are covered or uncovered, create noticeable artefacts during the display of the motion compensated interpolated video sequence, irrespective of the complexity of the algorithm. This is why the interpolator must not only supply the motion compensated sequence. It may be preferable to supply, for some portions of the input video sequence, an interpolated sequence obtained by a linear filtering of the input video sequence in the spatial and/or temporal domain or a combination (or mixture) between the motion compensated interpolated sequence and the interpolated sequence obtained by filtering. A device implementing such a procedure is shown in FIG. 2. It comprises a motion estimator 10 to estimate a motion vector for each pixel of the frame to interpolate from source frames surrounding said frame to interpolate. A motion compensation interpolation device 20 is planned to generate a motion compensated interpolated frame from source frames and from motion vectors estimated for each pixel of the interpolated frame. A linear interpolation device 30 is designed to generate a second interpolated frame by linear filtering of the source frames surrounding it. A mixer 40 is present at the output of the interpolation devices 20 and 30 to generate a final interpolated frame that is a mixture of the motion compensated interpolated frame and the interpolated frame obtained by linear filtering of the source frames. This mixture is operated by assigning the mixing coefficients (or weighting) to each of the two interpolated frames, and more precisely to each of the pixels of the said interpolated frames. These mixing coefficients are determined by the mixer 40 for example according to the amplitude of the motion vector of the pixel considered. For example, the more rapid the motion, the lower the weighting coefficient applied to the image by linear filtering and the higher the weighting coefficient applied to the motion compensated frame, the sum of these two weighting coefficients being equal to 1.

Figure 3:
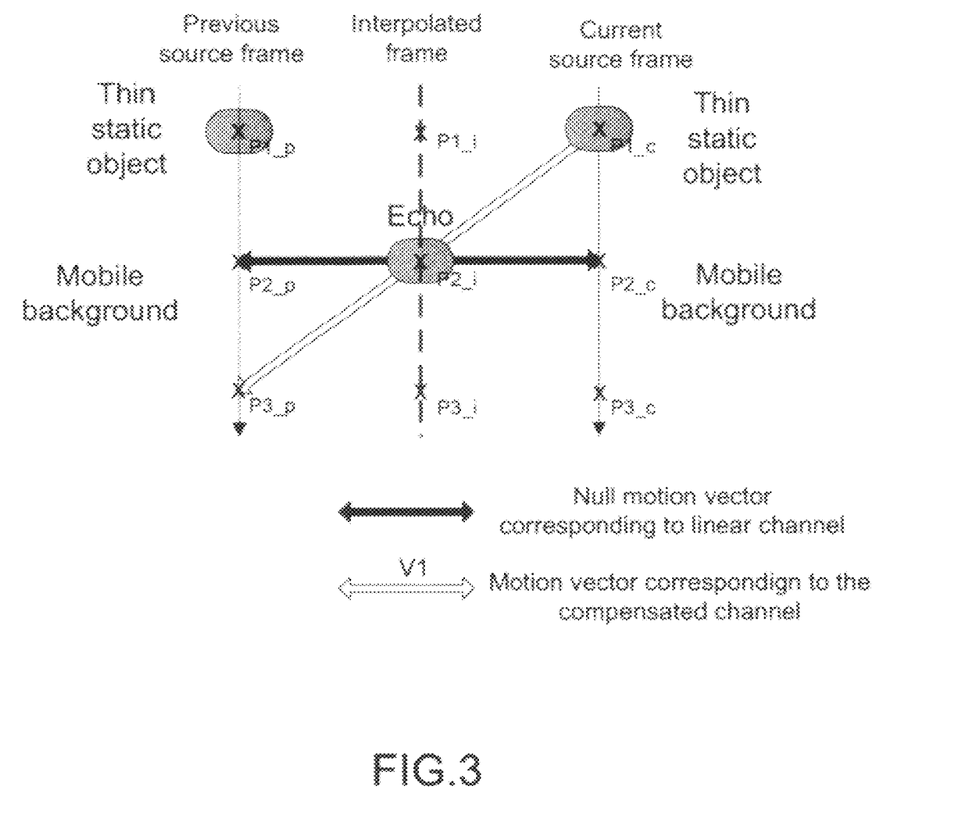

This device does not operate correctly when the estimated motion vectors are defective and when these vectors point to pixels having very different video information. FIG. 3 shows such a case. A thin static object on a mobile background is displayed on a previous source frame shown by 3 pixels P1_$p$, P2_$p$, P3_$p$ and a current source frame shown by 3 pixels P1_$c$, P2_$c$, P3_$c$. With a purpose of simplification, the images are shown on a single dimension. It is sought to generate an interpolated frame shown by 3 pixels P1_$i$, P2_$i$, P3_$i$ between the previous source frame and the current source frame. The thin static object is displayed on pixel P1_$p$ of the previous source frame and the p1_$c$ of the current source frame. The motion estimator has supplied a defective motion vector V1 for the pixel P2_$i$. If the device of FIG. 2 is used and if V1 is greater than a threshold from which the motion compensated frame is given priority on the device output (high weighting coefficient for the motion compensated frame), then the video level of the static object on the pixel p2_$i$ is fed back, which creates an echo.

Figure 4:
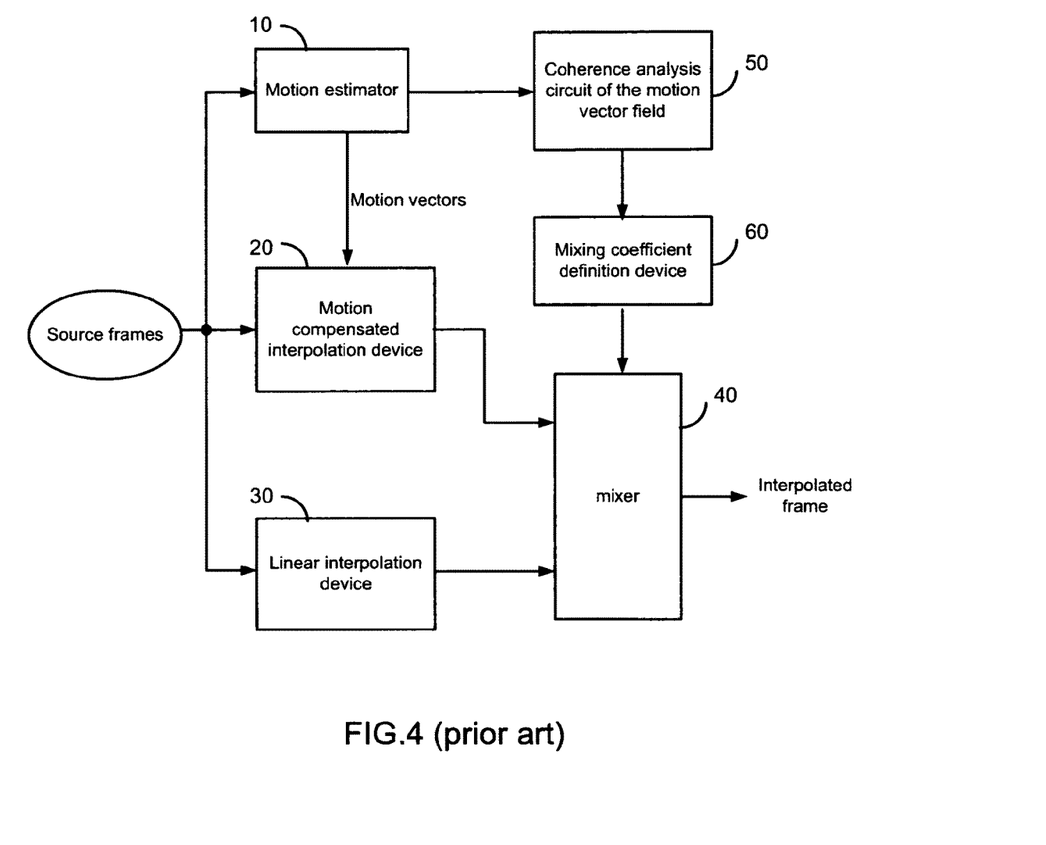

However, there are devices such as shown in FIG. 3 to improve the mixture that is divulged in European patent EP 0 390 660. The elements of this device that are already present in FIG. 2 are identified with the same reference in FIG. 4. The sequence of source frames is applied simultaneously to a motion estimator 10, to a motion compensation interpolation device 20, and to a linear interpolation device 30. The motion compensation interpolation device 20 processes the source frames from motion vectors received from the motion estimator 10. One output of the motion estimator 10 that supplies the motion vector field is connected to a coherence analysis circuit 50 of the motion vector field whose structure is described in detail in the patent EP 0 390 660. This circuit supplies for example a coherence binary matrix, in which the defective motion vectors are marked. This binary matrix is applied to a definition circuit 60 of the mixing coefficients to apply to a mixer 40 receiving furthermore the video information from the motion compensation interpolation device 20 and the information received from the linear interpolation devices 30. The video information mixing coefficients coming from interpolation devices 20 and 30 are determined according to the content of the matrix. If the motion vector of the current pixel of the frame to interpolate is considered to be defective, the mixing coefficient i assigned to the motion compensated channel will be low and the coefficient 1−i assigned to the linear channel will be higher. The mixer 60 thus delivers a sequence of interpolated frames that is a mixture of the sequence supplied by the device 20 and by the sequence supplied by the device 30.

The present invention proposed another solution enabling the defects of the motion estimator to be overcome that is simpler to implement. More generally, the purpose of the invention is to reduce the defects created by the motion compensation estimator carried out in the critical zones for the motion estimator, namely the zones not having temporal continuity, particularly the zones that appear or disappear from one frame to another.

The present invention relates to a device for generating an interpolated frame from source frames temporarily surrounding it, comprising:

estimating means of a motion vector for at least one current pixel of the frame to interpolate from said source frames, motion compensation interpolation means to generate a first motion compensated interpolated frame, the characteristics of the current pixel of the said first interpolated frame being determined from the characteristics of the pixels of the source frames determined by the motion vector estimated for the said current pixel, linear interpolation means to generate a second interpolated frame by linear filtering between the pixels of same coordinates as the current pixel in the source frames, mixing means to mix, for each current pixel of the frame to interpolate, the characteristics of the pixels of same coordinates in which said first and second frames interpolated in such a manner as to generate the said interpolated frame, a mixing coefficient ($\alpha$, $1-\alpha$) being assigned to each of said first and second interpolated frames for each current pixel.

This device is remarkable in that it furthermore comprises calculating means, for each current pixel of the interpolated frame, of a first displaced frame difference value (DFD) between the pixels of the source frames determined by the estimated motion vector for said current pixel and a second frame difference value (FD) between the pixels of same coordinates as the current pixel in the source frames, and in that the mixing means determines the mixing coefficients, for each current pixel of the interpolated frame, according to the said first displaced frame difference value (DFD) and/or second frame difference value (FD) calculated for this pixel and/or the estimated motion vector.

According to one particular embodiment, the mixing coefficient assigned to said second interpolated frame is equal to the ratio of the first displaced frame difference value (DFD) over the sum of the first (DFD) and second (FD) frame difference values and the sum of the mixing coefficients applied to the first and second interpolated images is equal to 1.

In practice, if the source frame comprises several colour components, for example R, G and B, the device then generates an interpolated frame for each of the said colour components. In this case, a mixing coefficient is calculated for each of the colour components from source frames relative to this colour component and, to prevent the appearance of a coloured effect that would be at a processing difference between the different colour components, the maximum value ($\alpha_{max}$) of these mixing coefficients is assigned to the second interpolated frame of each colour component for the mixture.

Preferably, this maximum value is weighted by a regularisation function g intended to give priority to the first interpolated frame with respect to the second interpolated image when the first (DFD) and second (FD) frame difference values are low.

The invention will be better understood upon reading the following description, provided as a non-restrictive example and referring to the annexed drawings wherein:

FIG. 1, already described, shows the generation of an interpolated frames from two source frames, FIG. 2, already described, shows a first interpolation device in accordance with the prior art, FIG. 3, already described, shows the defects of the device of FIG. 2, FIG. 4, already described, shows a second interpolation device in accordance with the prior art.

According to the invention, the mixing coefficients assigned to the motion compensated interpolated frame and to the linear interpolated frame are determined for each pixel of the frame to interpolate according to a Displaced Frame Difference or DFD between the pixels associated with the source frames determined by the estimated motion vector for said current pixel and/or a Frame Difference or FD between the pixels of same coordinates as the current pixel in the source frames and/or the estimated motion vector for said current pixel.

Figure 5:
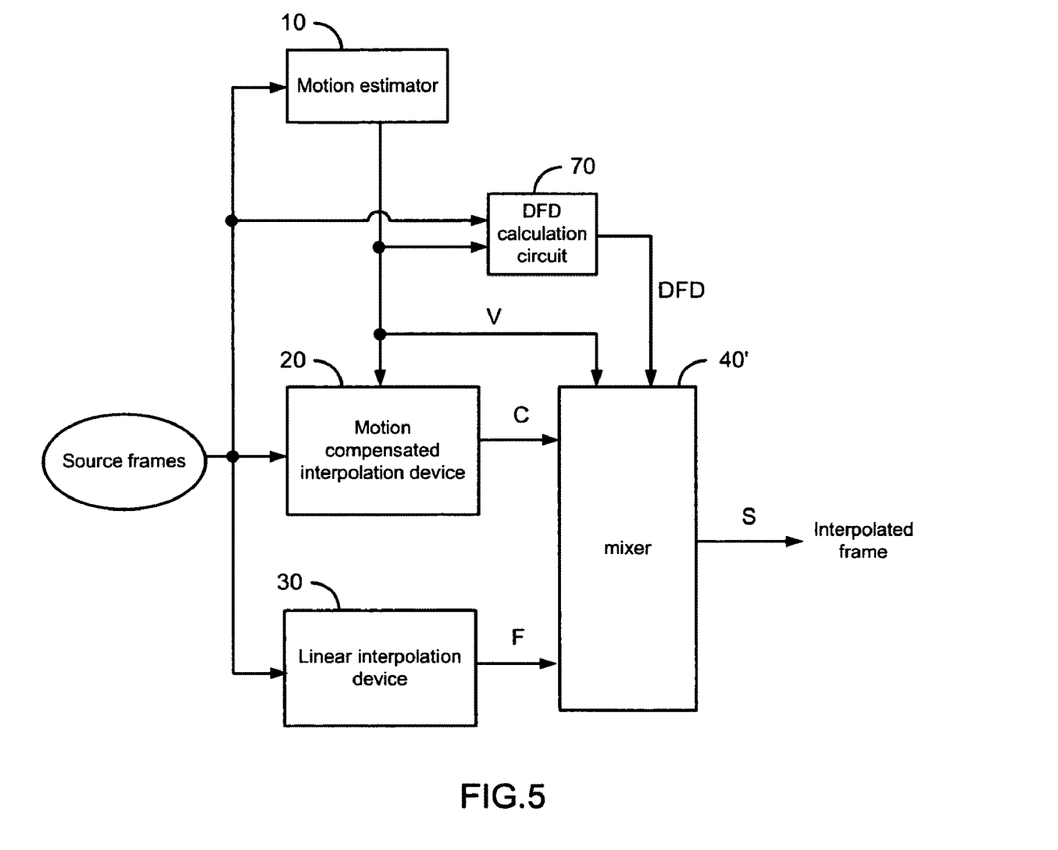
FIG. 5 shows a first interpolated frame generation device in accordance with the invention.

A first embodiment of a device in accordance with the invention is illustrated by FIG. 5. The identical elements to those of FIG. 2 or 4 carrying the same numerical references. The sequence of source frames is applied simultaneously to a motion estimator 10, to a motion compensation interpolation device, 20, and to a linear interpolation device 30. The motion estimator 10 generates a motion vector for each one current pixel of the frame to interpolate from previous and current source frames surrounding this frame. The device 20 generates a first motion compensated interpolated frame from these current and previous source frames, the characteristics of the current pixel of this first interpolated frame being determined from the characteristics of the pixels of the source frames determined by the estimated motion vector for the current pixel. If the estimated motion vector does not point, in the source frames, to a particular pixel but to a frame point located between several pixels, the characteristics of the closest neighbour can be used or a mean or bilinear interpolation of the closest pixels made. The device 30 generates a second frame interpolated by linear filtering between the pixels of same coordinates as the current pixel in the source frames. A calculation circuit 70 is provided to calculate, for each current pixel of the interpolated frame, a frame difference value (corresponding to a DFD) between the pixels of the source frames determined by the estimated motion vector for said current pixel. A DFD calculation is generally carried out in the motion estimator. Consequently, this calculation circuit 70 can be an integral part of the motion estimator 10. A mixer 40' is finally provided to mix, for each current pixel of the frame to interpolate, the characteristics of the pixels of same coordinates in the first and second interpolated frames in such a manner as to generate the interpolated frame. For this operation, a mixing coefficient, for each current pixel, is assigned to each of the first and second interpolated frames. In the embodiment shown in this figure, the mixing coefficients are determined, for each current pixel of the interpolated frame, according to the frame difference value (DFD) calculated by the circuit 70 and/or the estimated motion vector for this pixel.

The mixing performed in the circuit 40' is for example the following, for a given pixel of the interpolated frame:

$$S=(1-\alpha)*C+\alpha*F$$

where
- S is the value of the relevant pixel after mixing,
- C is the value of the relevant pixel of the motion compensated interpolated sequence,
- F is the value of the relevant pixel of the sequence obtained by linear filtering,
- α is the mixing coefficient applied to the pixel of the sequence obtained by linear filtering, and
- 1−α is the mixing coefficient applied to the pixel of the motion compensated sequence.

The mixing coefficient α can be defined in the following manner: $\alpha=k*(1+V^2)*DFD$ where k is a multiplying coefficient enabling the resolution of the coefficient α to be modified and/or give priority to the linear channel with respect to the motion compensated channel, V is the amplitude of the motion vector, and DFD is the displaced frame difference for the relevant pixel.

Hence, according to the invention, if the video information of the pixels pointed to by the motion vector are close, i.e. their DFD difference is low, this means that the estimated motion vector is correct and that the motion compensated interpolated frame will be given priority (the coefficient 1−α is high) at the output of the mixer. Conversely, if the DFD difference is high, the estimated motion vector is not very good and the interpolated frame obtained by filtering is given priority (the coefficient α is high).

Figure 6:
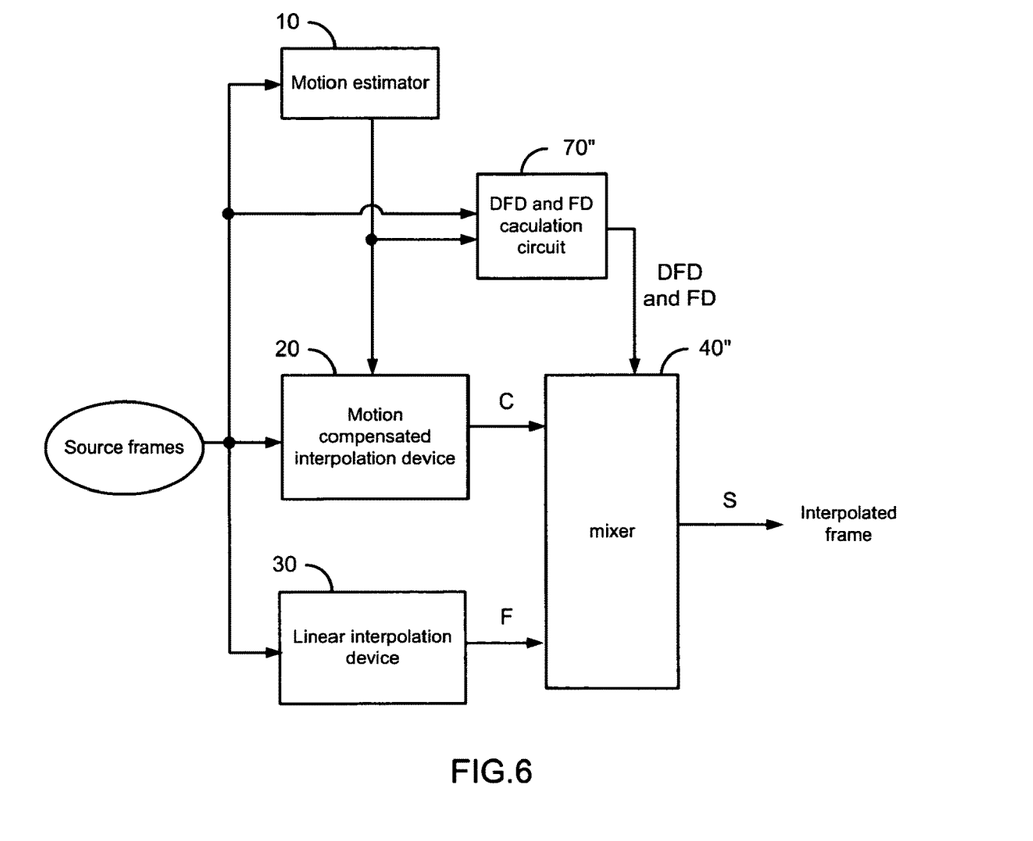
FIG. 6 shows a second interpolated frame generation device in accordance with the invention.

A second device embodiment is proposed in FIG. 6. The elements identical to those of FIG. 5 carry the same numerical references. The sequence of source frames is applied simultaneously to a motion estimator 10, to a motion compensation interpolation device 20, and to a linear interpolation device 30. The motion estimator 10 generates a motion vector for each one current pixel of the frame to interpolate from previous and current source frames surrounding this frame. The device 20 generates a first motion compensated interpolated frame from these current and previous source frames, the characteristics of the current pixel of this first interpolated frame being determined from the characteristics of the pixels of the source frames determined by the estimated motion vector for the current pixel. If the estimated motion vector does not point, in the source frames, to a particular pixel but to a frame point located between several pixels, the characteristics of the closest neighbour can be used or a mean or bilinear interpolation of the closest pixels made. The device 30 generates a second frame interpolated by linear filtering between the pixels of same coordinates as the current pixel in the source frames. A calculation circuit 70' is provided to calculate, for each current pixel of the interpolated frame, a first frame difference value (corresponding to a DFD) between the pixels of the source frames determined by the estimated motion vector for said current pixel and a second frame difference value (corresponding to an FD) between the pixels of same coordinates as the current pixel in the source frames. A DFD calculation is generally carried out in the motion estimator. Consequently, this calculation circuit 70 can be an integral part of the motion estimator 10. A mixer 40" is finally provided to mix, for each current pixel of the frame to interpolate, the characteristics of the pixels of same coordinates in the first and second interpolated frames in such a manner as to generate the interpolated frame. For this operation, a mixing coefficient, for each current pixel, is assigned to each of the first and second interpolated frames. In the embodiment shown in this figure, the mixing coefficients are determined, for each current pixel of the interpolated frame, according to the frame difference value DFD and/or the second difference value FD calculated by the circuit 70.

The mixing performed in the circuit 40" is for example the following, for a given pixel of the interpolated frame, namely:

$$S=(1-\alpha)*C+\alpha*F$$

where
- S is the value of the relevant pixel after mixing,
- C is the value of the relevant pixel of the motion compensated interpolated sequence,
- F is the value of the relevant pixel of the sequence obtained by linear filtering,
- α is the mixing coefficient applied to the pixel of the sequence obtained by linear filtering, and
- 1−α is the mixing coefficient applied to the pixel of the motion compensated sequence.

The mixing coefficient α is nevertheless determined in a different manner since it is a function of the values of DFD and FD calculated for the current pixel:

$$\alpha = \frac{DFD}{DFD+FD}$$

Moreover, if it is considered that each source frame comprises at least two colour components, by a red component, a green component and a blue component B, the interpolation must be operated on each of the components. A calculation of the DFD and FD frame differences is performed separately on each of the colour components of the video signal. A mixing coefficient α is then determined for each of the components. It is then possible:
- either to process each of the colour components separately and therefore to generate an interpolated frame for each of these components without taking into account other components; a coefficient noted $\alpha_{red}$, $\alpha_{green}$, $\alpha_{blue}$ is calculated for each of the red, green and blue components respectively then used to generate the red, green and blue interpolated frame,
- or to process them globally and generate an interpolated frame for each of these components by taking into account other components; this second possibility is the most advantageous as it can prevent the appearance of colour effects even if there is the same coefficient α for the three colour components; this coefficient is preferably the maximum value of the coefficients $\alpha_{red}$, $\alpha_{green}$, $\alpha_{blue}$; this common coefficient is noted $\alpha_{max}$ with $\alpha_{max}=\max(\alpha_{red},\alpha_{green},\alpha_{blue})$; the linear channel is thus given priority when there is an error on one of the components (the larger α is, the greater the proportion of the linear channel in the final result)

Figure 7:
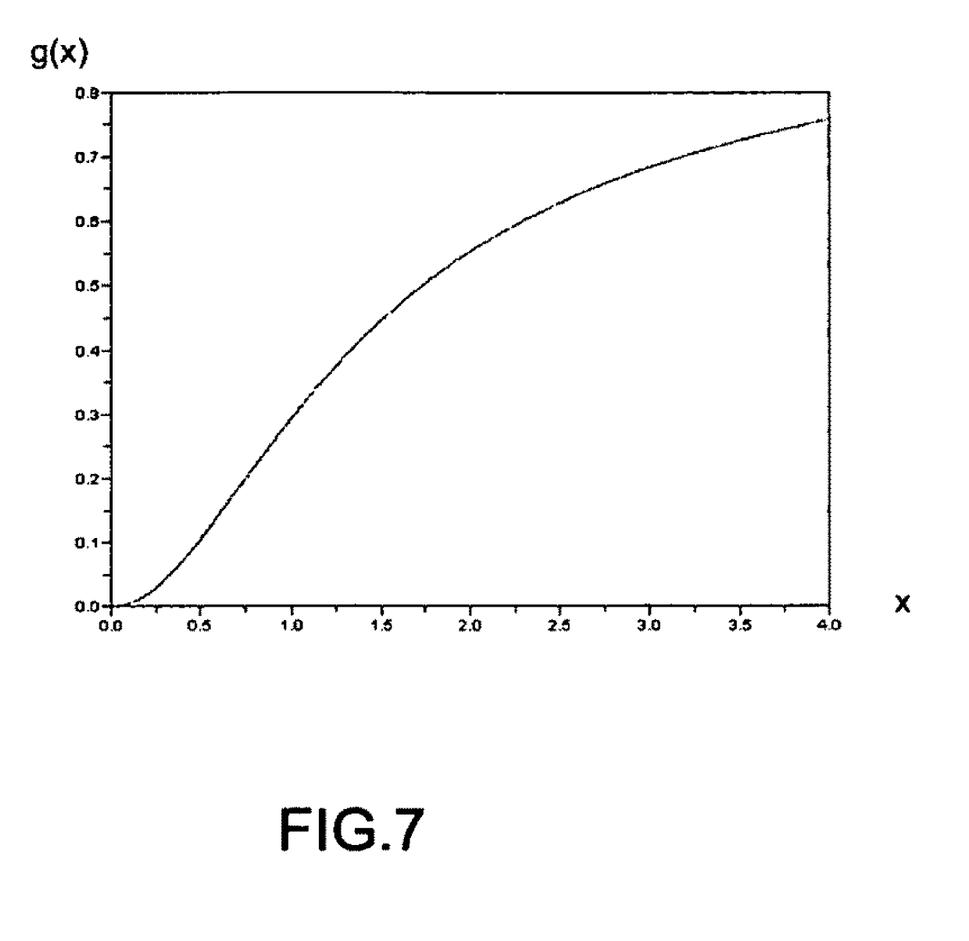
FIG. 7 is a graph curve showing a weighting function to apply to the mixing coefficient associated with the motion compensated frame.

As the calculation of the coefficients α depends directly on the values of DFD and FD, a regularisation function g is advantageously introduced into this calculation to give priority to the compensated channel when the two values of DFD and FD are low. This is an increasing function between 0 and 1 ("soft" thresholding). The function g is for example of the type $$g(x) = 1 - \frac{1}{\sqrt{1+x^2}}$$

where x is the sum of the said first and second frame difference values. The curve of this function is shown in FIG. 7.

Figure 8:
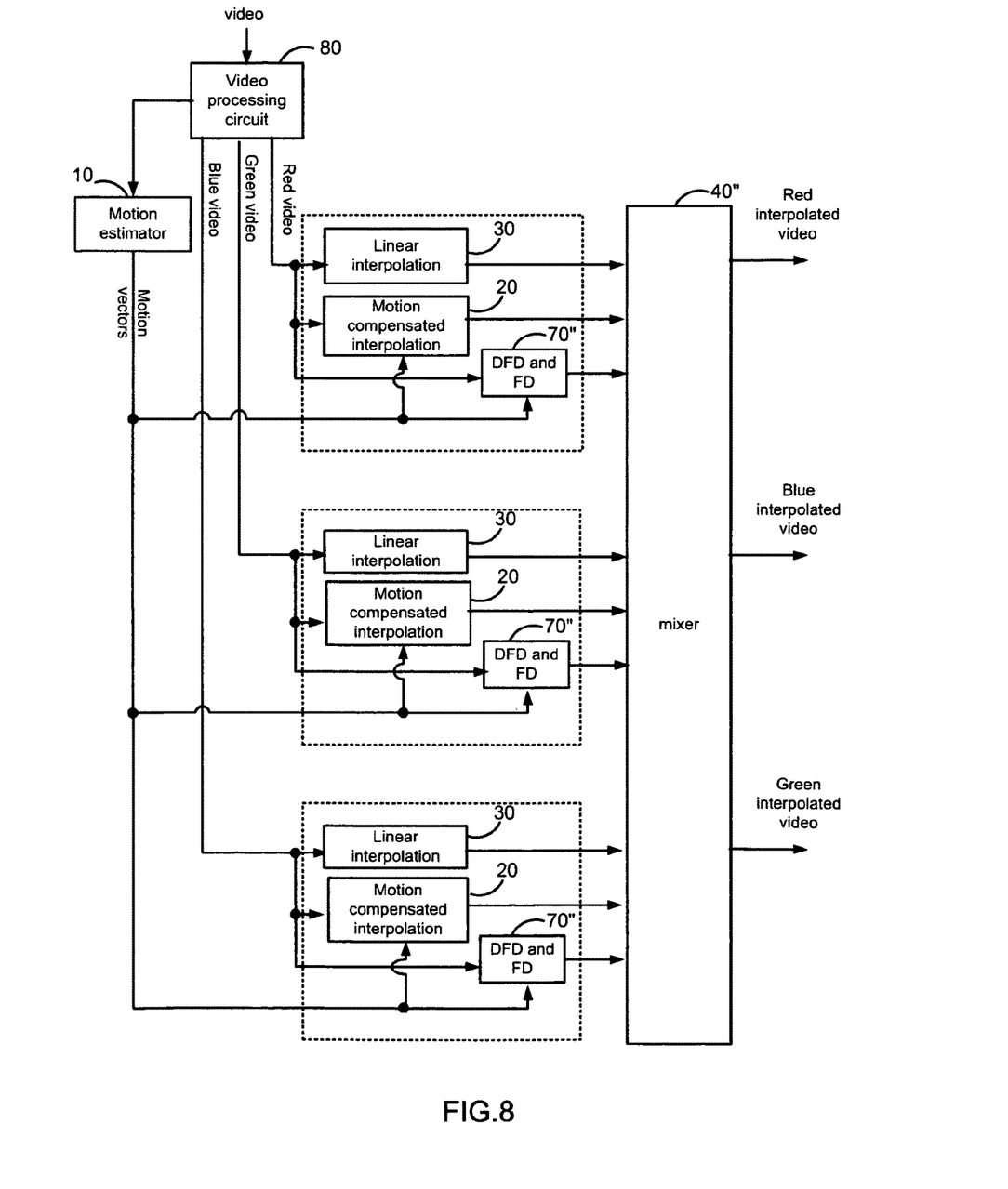
FIG. 8 shows a device showing the processing of each of the colour components of the source frames.

The final interpolation is written thus $S=(1-\alpha)*C+\alpha*F$ with $\alpha=g(DFD+FD)*\alpha_{max}=g(DFD+FD)*\max(\alpha_{red},\alpha_{green},\alpha_{blue})$ A device suitable to implement this embodiment is shown in FIG. 8. The elements already present in the previous figures are identified by the same numerical numbers. The video signal of the sequence of source frames is converted by a video processing circuit 80 into 3 signals each representing a colour component R, G and B. This video signal is also applied to a motion estimator 10. The red, green and blue signals are then processed separately by a distinct block comprising a motion compensation interpolation device 20, a linear interpolation device 30 and a calculation circuit 70" of DFD and FD. These means are connected as shown in FIG. 6. The devices 20 of each block receive the motion vectors generated by the motion estimator 10 and process the colour signals from these vectors. The output of the devices 20 and 30 and of the calculation circuit 70" of each block is connected to a mixer 40" suitable to implement the interpolation described in the previous paragraph.

There are many advantages of these different devices:
- it is possible to obtain a temporal continuity of the compensation, namely that the video levels are always close in the direction of the motion,
- the final result accounts both for the error in the direction of the motion but also for the error in the linear channel,
- it considerably reduces the errors due to the defects produced by the estimator,
- it limits the coloured echoes at the junction of different zones of motion, and
- it can be applied to any type of conversion, for example: 50->60 Hz, 50->75 Hz, 50->100 Hz and conversely.

Of course, the invention is not limited to the embodiments previously described. In particular, a person skilled in the art will be able to use other mixing coefficients and/or weighting function.

The invention claimed is:

1. Device for generating an interpolated frame from source frames temporarily surrounding it, comprising:
    a motion estimator for estimating a motion vector for at least one current pixel of the frame to interpolate from said source frames,
    a motion compensated interpolation device to generate a first motion compensated interpolated frame, the characteristics of the current pixel of the said first interpolated frame being determined from the characteristics of the pixels of the source frames determined by the motion vector estimated for the said current pixel,
    a linear interpolation device to generate a second interpolated frame by linear filtering between the pixels of same coordinates as the current pixel in the source frames,
    a mixer to mix, for each current pixel of the frame to interpolate, the characteristics of the pixels of same coordinates wherein said first and second frames interpolated in such a manner as to generate said interpolated frame, a mixing coefficient being assigned to each of said first and second interpolated frames for each current pixel,
    a calculation circuit for calculating, for each current pixel of the interpolated frame, a first frame difference value between the pixels of the source frames determined by the estimated motion vector for said current pixel and a second frame difference value between the pixels of same coordinates as the current pixel in the source frames,
    wherein the mixer determines the mixing coefficients, for each current pixel of the interpolated frame, according to the said first frame difference value and/or second frame difference value calculated for this pixel and/or the estimated motion vector, the mixing coefficient assigned to said second interpolated frame being equal to the ratio of the first frame difference value over the sum of the first and second frame difference values.

2. Device according to claim 1, wherein the sum of the mixing coefficients applied to the first and second interpolated images is equal to 1.

3. Device according to claim 1, wherein, each source frame comprising at least two colour components, it generates an interpolated frame for each of said colour components.

4. Device according to claim 1, wherein a mixing coefficient is calculated for each of the colour components from source frames relative to this colour component and in that the maximum value of said mixing coefficients is assigned to the second interpolated frame of each colour component for the mixture.

5. Device according to claim 4, wherein said maximum value of said mixing coefficients applied to the second interpolated frame of each colour component is weighted by a regularisation function to give priority to the second interpolated frame when said first and second frame difference values are low.

6. Device according to claim 5, wherein the regularisation function is of the type $$g(x) = 1 - \frac{1}{\sqrt{1+x^2}}$$

where x is the sum of the said first and second frame difference values.

* * * * *